(12) United States Patent
Mott

(10) Patent No.: US 7,741,609 B2
(45) Date of Patent: Jun. 22, 2010

(54) ADAPTING A HIGH-PERFORMANCE PULSE PROCESSOR TO AN EXISTING SPECTROMETRY SYSTEM

(75) Inventor: Richard B. Mott, Ringoes, NJ (US)

(73) Assignee: Pulsetor, LLC, Ringoes, NJ (US)

(*) Notice: Subject to any disclaimer, the term of this patent is extended or adjusted under 35 U.S.C. 154(b) by 138 days.

(21) Appl. No.: 12/184,605

(22) Filed: Aug. 1, 2008

(65) Prior Publication Data

US 2009/0034682 A1 Feb. 5, 2009

Related U.S. Application Data

(60) Provisional application No. 60/963,313, filed on Aug. 3, 2007.

(51) Int. Cl.
*G01T 1/24* (2006.01)
(52) U.S. Cl. .................................. 250/370.09
(58) Field of Classification Search ........... 250/370.01–370.15; 378/98.8
See application file for complete search history.

(56) References Cited

U.S. PATENT DOCUMENTS

| | | | |
|---|---|---|---|
| 3,872,287 A | 3/1975 | Koeman | |
| 4,152,596 A | 5/1979 | Marshall, III | |
| 4,217,496 A | 8/1980 | Daniels et al. | |
| 4,593,198 A | 6/1986 | Pang et al. | |
| 4,612,443 A | 9/1986 | Alcidi | |
| 4,692,626 A | 9/1987 | Westphal | |
| 4,835,703 A | 5/1989 | Arnold et al. | |
| 4,870,282 A | 9/1989 | Lacy | |
| 4,968,889 A | 11/1990 | Hartwell et al. | |
| 5,120,962 A | 6/1992 | Rundt et al. | |
| 5,134,294 A | 7/1992 | Rundt et al. | |
| 5,206,174 A | 4/1993 | Gehrke et al. | |
| 5,210,423 A | 5/1993 | Arseneau | |
| 5,225,682 A | 7/1993 | Britton, Jr. et al. | |
| 5,276,615 A | 1/1994 | Tournier et al. | |

(Continued)

OTHER PUBLICATIONS

Friel et al., "Energy-Dispersive Spectrometry from Then until Now: A Chronology of Innovation,", 1999, Microscopy and Microanalysis, vol. 4, pp. 559-566.*

(Continued)

*Primary Examiner*—David P Porta
*Assistant Examiner*—Kiho Kim
(74) *Attorney, Agent, or Firm*—Eckert Seamans Cherin & Mellott, LLC; Philip E. Levy, Esq.

(57) ABSTRACT

A method of utilizing the output of a first pulse processor, such as processor designed for use with an SDD, to generate the input signal expected by the second pulse processor, such as an existing processor not designed for use with an SDD. In one embodiment, piled-up pulses which would not be detected as such by the second pulse processor are omitted from the generated input signal. The method generates an output (which then serves as the input signal for the second pulse processor) of the same general form as the ramp signal from a detector with a pulsed-reset preamplifier, but which does not have the same noise characteristics. In addition, the method may alter the timing between the reconstructed steps in the ramp to increase the maximum throughput of the second pulse processor beyond what is normally possible with a direct connection to the associated detector.

31 Claims, 3 Drawing Sheets

U.S. PATENT DOCUMENTS

| | | | |
|---|---|---|---|
| 5,304,808 | A | 4/1994 | Odell |
| 5,349,193 | A | 9/1994 | Mott et al. |
| 5,349,195 | A | 9/1994 | Dumont |
| 5,393,982 | A | 2/1995 | Mott et al. |
| 5,430,406 | A | 7/1995 | Kolodziejczyk |
| 5,684,850 | A | 11/1997 | Warburton et al. |
| 5,774,522 | A | 6/1998 | Warburton |
| 5,808,306 | A | 9/1998 | Skillicorn et al. |
| 5,873,054 | A | 2/1999 | Warburton et al. |
| 5,892,227 | A * | 4/1999 | Schieber et al. ........ 250/370.12 |
| 6,160,259 | A | 12/2000 | Petrillo et al. |
| 6,177,675 | B1 | 1/2001 | Gagnon et al. |
| 6,215,122 | B1 | 4/2001 | Clifford et al. |
| 6,369,393 | B1 | 4/2002 | Jordanov |
| 6,426,993 | B1 | 7/2002 | Satoh |
| 6,470,285 | B1 | 10/2002 | Atwell |
| 6,522,984 | B1 | 2/2003 | Jordanov |
| 6,525,322 | B2 | 2/2003 | Wong et al. |
| 6,525,323 | B1 | 2/2003 | Vesel et al. |
| 6,576,907 | B1 | 6/2003 | Klein et al. |
| 6,590,957 | B1 | 7/2003 | Warburton et al. |
| 6,901,337 | B2 | 5/2005 | Tanaka et al. |
| 6,936,822 | B2 | 8/2005 | Wong et al. |
| 6,967,329 | B2 * | 11/2005 | Sipila et al. ............ 250/339.13 |
| 2002/0001365 | A1 * | 1/2002 | Mazor et al. .................. 378/89 |
| 2002/0060606 | A1 | 5/2002 | Andre |
| 2004/0158440 | A1 | 8/2004 | Warburton et al. |
| 2004/0206909 | A1 | 10/2004 | Izumi et al. |
| 2006/0015290 | A1 | 1/2006 | Warburton et al. |
| 2006/0120508 | A1 | 6/2006 | Chen et al. |
| 2006/0151707 | A1 | 7/2006 | Wellnitz et al. |
| 2006/0180767 | A1 | 8/2006 | Ramsden |

OTHER PUBLICATIONS

Newbury, Dale E., X-ray Mapping in the Spectrum Image Mode at Output Count Rates above 100 kHz with the Silicon Drift Detector (SDD), Microsc Microanal 12 (Supp 2), 2006, 2 pp.

Guo, Weijun et al., A study of the real-time deconvolution of digitized waveforms with pulse pile up for digital radiation spectroscopy, Nuclear Instruments and Methods in Physics Research A 544 (2005) pp. 668-678.

Srinivasan, R., "Simulation of CFAR detection algorithms for arbitrary clutter distributions", IEE Proc.-Radar, Sonar Navig., vol. 147, No. 1, Feb. 2000.

* cited by examiner

ADAPTING A HIGH-PERFORMANCE PULSE PROCESSOR TO AN EXISTING SPECTROMETRY SYSTEM

CROSS-REFERENCE TO RELATED APPLICATIONS

This application claims the benefit of U.S. Provisional Application No. 60/963,313, entitled "ADAPTING A HIGH-PERFORMANCE PULSE PROCESSOR TO AN EXISTING SPECTROMETRY SYSTEM", filed on Aug. 3, 2007, the disclosure of which is incorporated herein by reference.

FIELD OF THE INVENTION

The present invention relates to energy-dispersive radiation spectrometry systems, such as X-ray spectrometry systems or gamma-ray spectrometry systems, and in particular to methods for generating an input signal suitable for a pulse processor of an existing energy-dispersive radiation spectrometry system using a high performance pulse processor designed for use with a high performance detector, such as a silicon drift detector.

BACKGROUND OF THE INVENTION

Energy-dispersive radiation spectrometry systems, such as, without limitation, X-ray spectrometry systems or gamma-ray spectrometry systems, are used for detecting, measuring and analyzing radiation emissions, such as X-ray emissions or gamma-ray emissions, from, for example, a scanning electron microscope (SEM). A typical energy-dispersive radiation spectrometry system includes the following four main components: (1) a detector, (2) a pre-amplifier, (3) a pulse processor, and (4) a computer-based analyzer. For convenience only, and not for purposes of limitation, the following description will relate to X-ray spectrometry systems and photons in the form of X-rays (as compared to, for example, photons in the form of gamma-rays that are detected in a gamma-ray spectrometry system).

The detector, which usually takes the form of a semiconductor sensor of some type, converts an incoming X-ray into a very small current pulse, typically on the order of tens of thousands of electrons, with a duration of about tens to a few hundreds of nanoseconds. The magnitude of each of the current pulses is proportional to the energy of the X-ray.

The pre-amplifier amplifies the current pulse output by the detector and typically converts it into a voltage signal in the range of tenths of millivolts up to a few hundreds of millivolts. There are two main types of preamplifiers: "tail pulse" or RC-coupled preamplifiers, and pulsed-reset preamplifiers. The subject matter described elsewhere herein applies to both types of preamplifiers. However, for convenience, the subject matter is described with reference to the pulsed-reset type.

In a pulsed-reset type of preamplifier, the charge generated in the sensor is integrated in a feedback capacitor such that the resulting voltage increases in steps of varying heights and intervals, until it reaches an upper limit. When that limit is reached, a "reset" pulse is applied which drains the accumulated charge from the feedback capacitor, restoring the preamplifier to near its minimum output voltage in a short time, typically a few microseconds. Then, charge due to the interaction of X-rays with the detector accumulates on the feedback capacitor again, and the cycle repeats. The output signal of a pulsed-reset preamplifier is known in the art as a "ramp", due to its characteristic when observed with an oscilloscope of having a slow, irregular rise followed by a rapid return to its lower limit. In contrast, tail-pulse preamplifiers act as high-pass filters on the voltage step signal output by the detector, with an exponential return to baseline whose time constant is long compared to the charge integration time in a feedback capacitor of the preamplifier.

The pulse processor receives the pre-amplifier signal and generates a numeric representation of the X-ray's energy through an integration process. In older energy-dispersive radiation spectrometry systems, the pulse processor included two separate components, namely a "shaping amplifier" and an analog to digital converter. Modern energy-dispersive radiation spectrometry systems, on the other hand, typically combine these functions, with the newest designs digitizing the preamplifier signal directly and carrying out all pulse detection and filtering functions using digital signal processing.

The computer-based analyzer accumulates the X-ray energies output by the pulse processor into a spectrum or plot of the number of X-rays detected against their energies. The spectrum is divided into a somewhat arbitrary number of small ranges called "channels" or "bins." In older systems, a hardware component called a multi-channel analyzer (MCA) did the accumulation of X-rays into spectrum channels and a computer read out the summed result. In modern systems, the MCA function is handled in software, either by the computer or even within the pulse processor.

The job of the pulse processor is made more complex by several factors. For example, electronic noise is superimposed on the underlying signal received from the preamplifier. For X-rays that are near the lowest detectable energy level, the preamplifier output step height may be significantly smaller than the peak-to-peak excursions of the electronic noise. In such as case, the X-ray can only be detected by filtering the signal for a relatively long period of time before and after the step, to average away the contribution of the noise. The amount of such noise averaging is a fundamental operating parameter of all pulse processors. This averaging time is variously referred to in the art as "shaping time" or "peaking time."

Resolution of detectors for X-ray microanalysis is customarily reported as the full width in electron volts (eV) at half the maximum peak height (FWHM) of the Mn K-alpha emission line. Good quality lithium drifted silicon (Si(Li)) detectors have an optimum peaking time of up to 80-120 microseconds ($\mu S$) achieving a resolution under 130 eV with a maximum counting rate of around 1-2 kilocounts/sec (kcps), and a usable minimum peaking time around 2 $\mu S$ at a resolution of perhaps 240 eV with a maximum counting rate around 50 kcps. The majority of X-ray microanalyzers currently installed on scanning electron microscopes (SEM) use Si(Li) detectors.

Recently, a new generation of X-ray sensors known as silicon drift detectors (SDDs) has come on the market, with very different characteristics in several respects. In SDDs, the device capacitance is several orders of magnitude lower than in Si(Li) detectors because the electrons generated when an X-ray strikes the sensor are guided by the internal bias field to a small-spot anode. As a result, the rise time of the preamplifier output signal is up to four or five times shorter than for Si(Li) detectors, and the peaking time for equivalent energy resolution is enormously reduced, from 80-100+ $\mu S$ down to perhaps 2-4 $\mu S$. Also, an SDD operates at a higher temperature, and therefore higher leakage current, than a Si(Li) detector. Leakage current noise and various series and parallel noise components cause the measured resolution for an SDD as a function of peaking time to go through an optimum, then begin to become worse as the peaking time is increased beyond the optimum.

Because the peaking time in SDDs is reduced by a factor of about 25-40, the potential maximum counting rates are correspondingly higher. The superior rise time of SDDs allows for better correction at these high count rates of an error known in the art as "pulse pile-up". This occurs when two X-rays arrive at the detector so close in time that they cannot be distinguished from a single X-ray at the sum of their energies. Pulse processors specifically designed to take advantage of the characteristics of SDD detectors to improve pile-up detection are just now coming on the market.

Existing X-ray spectrometry systems, and in particular the pulse processors thereof, were designed around the characteristics of the Si(Li) detector which has been in use for about 40 years. As a result, existing pulse processors are not well suited to handle the output of SDDs (and associated preamplifiers). Specifically, in some cases, the existing pulse processor cannot be set to a sufficiently short peaking time to give optimum resolution from an SDD detector. The noise of a silicon detector becomes worse if the peaking time is longer than optimum, due to shaping-time-dependent noise as described above. This is rarely an issue with Si(Li) detectors, whose optimum shaping time is very long, but can become a problem with SDDs. A commercial example of a pulse processor which cannot be configured optimally for an SDD is the Gresham Titan model analog processor, which only has shaping time settings of 10 µS and 40 µS, while the optimum for an SDD is typically around 2-4 µS.

With the benefits of SDDs described above, users of such systems will likely want to replace the Si(Li) detectors (and associated preamplifiers) with SDDs (and associated preamplifiers). Because of the limitations of existing pulse processors described above, users of existing X-ray spectrometry systems wishing to switch to SDDs will also need to employ a new pulse processor designed to function with SDDs. From the user's point of view, it is desirable to not have to modify the existing X-ray spectrometry software to support the new pulse processor directly for a number of reasons. First, many of these existing systems are no longer well supported by the original manufacturers, due to a series of mergers and acquisitions over the last 10-15 years, or would require costly purchase of software upgrades. In addition, purchase of an entire new spectrometry system for the SDD would be significantly more expensive than purchasing only the SDD and a new pulse processor. Finally, it would also require the user to learn an entire new suite of spectrometry software.

U.S. Pat. No. 6,369,393 to Jordanov uses (possibly replicated) digital samples which have noise characteristics determined by the first stage of the preamplifier to fill in the required time separation between events before pulse shaping. The subject matter described herein contemplates improving performance by pulse shaping in one pulse processor to measure the X-ray energies, and then separating edges reconstructed from those energies by a signal with much lower noise than the first preamplifier stage for processing by a second pulse processor.

SUMMARY OF THE INVENTION

In one embodiment, a method of generating an input signal for a first pulse processor of an energy-dispersive radiation spectrometry system, such as an X-ray spectrometry system or a an gamma ray spectrometry system, is provided, wherein the first pulse processor has a first dead time per pulse associated therewith. The method includes receiving a preamplifier signal in a second pulse processor that has a second dead time per pulse associated with it that is shorter than the first dead time per pulse, detecting in the second pulse processor a plurality of edges in the preamplifier signal (the edges are separated in time and in a certain order), wherein each of the edges is determined to not be associated with a pileup, and generating a step function having a plurality of steps, wherein each of the steps in the step function corresponds to a respective one of the detected edges in the certain order, and wherein each adjacent pair of the steps is separated by at least the first dead time per pulse.

In a particular embodiment, for each adjacent pair of the detected edges that is separated in time by a time greater than the first dead time per pulse, the adjacent pair of the steps in the step function that corresponds thereto is separated by the time greater than the first dead time per pulse, and for each adjacent pair of the detected edges that is separated in time by a time less than or equal to the first dead time per pulse, the adjacent pair of the steps in the step function that corresponds thereto is separated by the first dead time per pulse. In another particular embodiment, each of the edges is determined by the second pulse processor to correspond to a valid energy measurement made by the second pulse processor (i.e., not a pileup situation), and a magnitude of each step is based on the valid energy measurement corresponding to the edge that corresponds to the step.

The step function may be a digital function, and the method may further comprise converting the digital function to an analog signal, wherein the analog signal is the input signal. Also, the detector may be a silicon drift detector, and the second pulse processor may be designed/optimized for use with that type of detector.

In another embodiment, a digital pulse processor is provided that is adapted to perform the method just described, wherein the digital pulse processor is the second pulse processor. In a further embodiment, an energy-dispersive radiation spectrometry system, such as an X-ray spectrometry system or a an gamma ray spectrometry system, is provided, includes a first pulse processor having a first dead time per pulse associated therewith, and a second pulse processor operatively coupled to the first pulse processor, the second pulse processor having a second dead time per pulse associated therewith, the second dead time per pulse being shorter than the first dead time per pulse. The second pulse processor is adapted to perform the various embodiments of the method just described.

In still another embodiment, a method of generating an input signal for a first pulse processor of an energy-dispersive radiation spectrometry system, such as an X-ray spectrometry system or a an gamma ray spectrometry system, is provided wherein the first pulse processor has a first pulse pair resolving time and a dead time per pulse associated therewith. the method includes receiving a preamplifier signal in a second pulse processor that has a second pulse pair resolving time associated therewith that is shorter than the first pulse pair resolving time, detecting in the second pulse processor a plurality of edges in the preamplifier signal, wherein the edges are separated in time and are in a certain order, and generating a step function having a plurality of steps, wherein each of the steps in the step function corresponds to a respective one of the detected edges in the order, and wherein for each adjacent pair of the edges that is separated in time by a time less than the second pulse pair resolving time the steps in the step function that correspond thereto are separated in time by at least the second pulse pair resolving time but less than the dead time per pulse.

In a particular embodiment, for each of the edges determined by the second pulse processor to correspond to a valid energy measurement made by the second pulse processor, a magnitude of the step corresponding to the edges is based on the valid energy measurement.

The step function may be a digital function, and the method may further include converting the digital function to an analog signal, wherein the analog signal is the input signal. Also, the detector may be a silicon drift detector, and the second pulse processor may be designed/optimized for use with that type of detector.

In another embodiment, a digital pulse processor is provided that is adapted to perform the method just described, wherein the digital pulse processor is the second pulse processor. In still another embodiment, an energy-dispersive radiation spectrometry system, such as an X-ray spectrometry system or a an gamma ray spectrometry system, is provided that includes a first pulse processor having a first pulse pair resolving time and a dead time per pulse associated therewith, and a second pulse processor operatively coupled to the first pulse processor, the second pulse processor having a second pulse pair resolving time associated therewith, the second pulse pair resolving time being shorter than the first pulse pair resolving time. The second pulse processor is adapted to perform the various embodiments of the method just described.

In yet another embodiment, a method of generating an input signal for a first pulse processor of an energy-dispersive radiation spectrometry system is provided, wherein the first pulse processor operates at a first shaping time and a corresponding first dead time per pulse. The method in this embodiment includes receiving a preamplifier signal that is generated in response to a first plurality of photons being detected by a detector, determining in an order according to arrival time at the detector an energy for each of a second plurality of the first plurality of photons based on the preamplifier signal using a second pulse processor operating at a second shaping time and a corresponding second dead time per pulse, the second shaping time being less than the first shaping time and the second dead time per pulse being less than the first dead time per pulse, storing each energy, and generating a step function of based on each stored energy, the step function having a plurality of steps, wherein each of the steps in the step function corresponds to a respective one of the stored energies in the order of the energies.

In one particular embodiment of this method, each of the second plurality of the first plurality of photons is determined to not be associated with a pileup, and each one of the steps is separated from an adjacent one of the steps by a time equal to or greater than the first dead time per pulse. The first shaping time may be a minimum nominal shaping time for the first pulse processor. The second shaping time may be an optimum shaping time for the second pulse processor.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
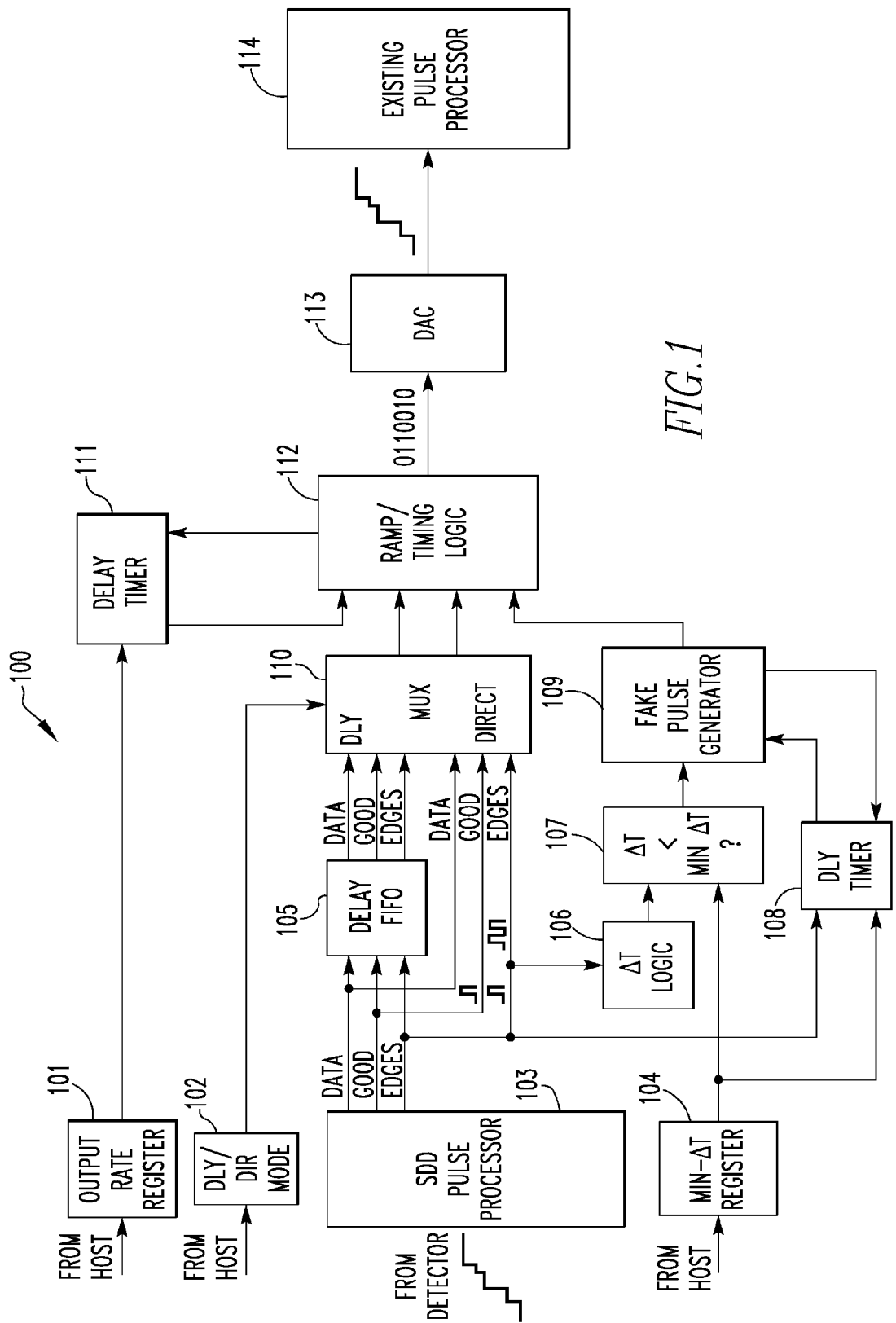
FIG. 1 is a block diagram of a portion of an X-ray spectrometry system 100 according to one embodiment which the present invention may be implemented.

The subject matter described herein applies to energy-dispersive radiation spectrometry systems generally. However, for ease of illustration and description, the invention will be described in connection with embodiments that employ an X-ray spectrometry system. This is not to be considered to be limiting, and it is to be understood that the invention may be applied in connection with other types of energy-dispersive radiation spectrometry systems, such as, without limitation, gamma-ray spectrometry systems.

It is an object of the present invention to allow the Si(Li) detector of an existing system to be replaced with an SDD detector without requiring any change in the hardware or software of the existing system. The method described herein takes the output of an SDD-optimized pulse processor and generates the input signal expected by the existing pulse processor. In one embodiment, piled-up pulses which would not be detected as such by the existing pulse processor are omitted from the generated input signal. Furthermore, the method generates an output (which then serves as the input signal for the existing pulse processor) of the same general form as the ramp signal from a detector with a pulsed-reset preamplifier, but which does not have the same noise characteristics. In particular, the output noise does not have the property of worsening resolution with peaking times longer than optimum for an SDD. The energy is measured accurately first with the pulse processor designed for SDDs, using the optimum peaking time, and then a corresponding step function is reproduced at the output which can then be re-measured at a longer peaking time without degradation.

In addition, in one particular embodiment, when employed in connection with a pulse processor such as the analog Gresham Titan with a minimum peaking time setting which is long compared to the SDD optimum, the method alters the timing between the reconstructed steps in the ramp to increase the maximum throughput of the existing pulse processor beyond what is normally possible with a direct connection to the detector.

In order to understand how this works, it is necessary to consider the statistical nature of the emission of photons in spectrometry. Radiation, whether naturally occurring or induced by some form of excitation, is a random process. No matter how high or low the average emission rate, with some non-zero probability the time interval between any two emitted X-rays can be arbitrarily long or short. The probability of getting a second X-ray within any time interval t is:

$$P = (1 - e^{-(rt)}) \quad (1)$$

where e is the base of natural logarithms and r is the average X-ray arrival rate.

When the interval between arriving X-rays is less than the selected peaking time, neither X-ray can be measured accurately and both are discarded. This is known in the art as "pulse pile-up".

For any given peaking time, 't' in the exponent of the above expression represents the shortest interval which allows X-rays to be detected as separate events by a pulse shaping filter with that peaking time. This is also known as the "dead time" (D) per pulse, during which no other X-rays may be measured. The term dead time per pulse as used herein shall have this meaning. A commonly reported parameter for pulse processors is the percent dead time, or the fraction of time during which the processor cannot measure pulses.

For a semi-Gaussian analog shaper such as the Gresham Titan, a minimum nominal shaping time of 10 microseconds means a D value near 25 µS. It is known in the art that pulse processors which are of the type called "paralyzable", in which the dead time is extended by a constant amount of time with each arrival of an X-ray at the detector, have a maximum throughput at a dead time according to equation (1) of about 63%. That would imply an input count rate r of about 40 kcps, and a maximum throughput rate of only 14.8 kcps. An input rate higher or lower than 40 kcps will result in lower throughput.

The maximum possible throughput for a D of 25 µS would be just under 40 kcps, if the X-rays were evenly spaced at intervals of just over 25 µS. A pulse processor designed for the much shorter peaking times of the SDD can achieve throughput count rates well in excess of this value. If the excitation conditions (such as beam current in the SEM) are set so as to produce an average throughput of, say, 38 kcps, the invention according to the maximum-throughput mode embodiment described in more detail herein stores the X-ray energies emerging from the SDD pulse processor at random intervals in a FIFO buffer, and reads them out to generate a step in the reconstructed ramp every 25 microseconds. The existing pulse processor therefore appears to be nearly 100% dead (which it is, since a new event is presented to it as soon as it has finished processing the last one).

A common SEM microanalysis application, known as "X-ray mapping", generates an image of the relative intensity of X-ray emission for one or more chemical elements at each pixel in the image. Because an X-ray spectrum must be collected at each of thousands of pixels, X-ray mapping requires a high count rate for completion in a reasonable time. Nearly tripling the maximum effective throughput by using an SDD is thus of great value in this area.

The typical time the beam remains on the same pixel in X-ray mapping is on the order of milliseconds for most existing systems which would have a processor like the Gresham Titan, so the small temporal displacements of the X-rays due to the FIFO time-averaging described above would not negatively affect the quality of the X-ray map images.

Finally, in many cases the hardware and software of the existing system derives information about the charge delivered to the specimen by the beam in a scanning electron microscope (SEM), which is important for some methods of quantitative analysis of X-ray spectra, from the dead-time reported by the existing pulse processor. For this application, it is not desirable to suppress pile-ups from the reconstructed ramp. Thus, in the dead-time preserving mode embodiment of the invention described in detail herein, when the new (SDD) pulse processor detects a pile-up too close to be detected by the existing pulse processor, a false X-ray in the ramp is generated. The false X-ray is separated from the real event by sufficient time and of sufficient amplitude to force pile-up detection by the existing pulse processor, but is close enough to the real X-ray not to distort the counting statistics significantly.

While the examples given are drawn from electron beam excited X-ray spectrometry, those of ordinary skill in the art will recognize that the methods described herein could be equally applied to X-ray fluorescence systems, which can also generate high count rates.

FIG. 1 is a block diagram of a portion of an X-ray spectrometry system 100 according to one embodiment which the present invention may be implemented. In the system 100, a host computer (not shown) sets three register variables: 1) the output rate register ("Rate") 101, which defines the minimum delay required between edges in the reconstructed ramp generated by the system 100 such that the existing pulse processor can measure them separately (which is the dead time per pulse of the existing pulse processor 114; 2) the delay/direct mode register ("Mode") 102, which selects whether edges to be added to the reconstructed ramp are delayed by at least the time defined in the Rate register or whether they are sent immediately through the ramp/timing logic 112 to the DAC 113 for output; and 3) the minimum delta-T register ("MinDT") 104, which defines the minimum separation required between two edges of middle energy (few keV equivalent) in order for the existing pulse processor to detect them as piled up. This latter value is known in the art as the "pulse pair resolving time", and as used herein, that term shall have the meaning just provided. It is assumed that the pulse-pair resolving time for the processor specifically designed for an SDD will be much shorter than that for an existing processor designed for Si(Li) type detectors.

The system 100 includes an SDD pulse processor 103 specifically designed for operation with an SDD and an existing pulse processor 114 that is not specifically designed for operation with an SDD (but rather is optimally used with a Si(Li) type detector). The SDD pulse processor 103 gets its input as a pulsed-reset ramp signal from the preamplifier of the SDD detector (not shown). The SDD pulse processor 103 generates three outputs: 1) the measured energy of each X-ray in digital form on the DATA lines; 2) a GOOD signal which is high when the DATA lines contain a valid energy measurement; and 3) a stream of edge-detected pulses. These edge-detected pulses are very short (on the order of 10 nS, shorter than the pulse pair resolving time of the SDD pulse processor), one for each edge (X-ray event) detected by the SDD pulse processor 103. In the case of pileup detected by the SDD pulse processor 103 (i.e. the GOOD line is low), the energy data is invalid (because the SDD pulse processor 103 cannot measure the energies accurately due to pileup) and two closely spaced pulses appear in the EDGES line, corresponding to the SDD pulse processor 103's best estimate of the time of occurrence of the two (or more) X-ray edges which make up the pileup sequence.

The delay/direct mode register 102 directs a MUX 110 to select DATA, GOOD and EDGES from either (i) a delay FIFO 105, or (ii) directly from the SDD pulse processor 103 with no delay. If the mode specified in the delay/direct mode register 102 is delay (DLY), data is taken from the delay FIFO 105 only when a delay countdown timer 111 reaches zero. The delay timer 111 is reset to the value in the output rate register 101 whenever an energy is taken from the delay FIFO 105, so that the interval between X-ray edges in the reconstructed ramp signal generated by the system 100 can never be less than the value in the output rate register 101 register when the specified mode is DLY.

In the DLY mode, the minimum delta-T register 104 is set to zero; it is not desirable to generate artificial pile-up pulses in the DLY mode because in that mode it is desired to see only GOOD pulses appearing in the reconstructed ramp at or near the maximum rate measurable by the existing pulse processor 114, as defined by the output rate register 101.

When the mode specified in the delay/direct mode register 102 is direct (DIR), the output rate register 101 is set to zero (there is no delay) and the output of the SDD pulse processor 103 appears in real time at the ramp/timing logic 112. The EDGES signal is also fed to delta-T logic 106, which measures successive intervals between detected edges. The output of a comparator 107 is active when delta-T is less than the contents of the minimum delta-T register 104. Just like the longer delay countdown timer 111, a shorter countdown delay timer 108 is initialized to the value of the minimum delta-T register 104 whenever an edge arrives on the EDGES line. When another edge arrives before the delay timer 108 reaches zero, i.e. the interval from the previous edge is too small to be detected as pileup by the existing pulse processor, as defined by the value of the minimum delta-T register 104, the delay timer 108 is reset as usual but a flag is set so an artificial X-ray with an energy of a few keV (sufficient to trigger the pileup circuits of any existing pulse processor) is generated by fake pulse-generator logic 109 when the delay timer 108 reaches zero, minDT after all pulses in the pileup sequence. This ensures that the two or more pulses in the pileup sequence will be successfully detected as pileup by the existing pulse processor 114 and discarded.

The ramp/timing logic 112 combines the digital edge values (real or artificial) and sums them into a final reconstructed ramp which is then fed to a digital-to-analog converter (DAC) 113 to create the analog input which is expected by the existing pulse processor.

The DAC 113 will have a certain bit range at its input. When an X-ray energy value added to the current value of the ramp exceeds a threshold which is typically around 80-90% of the top of the DAC bit range, the ramp/timing logic 112 initializes an internal timer which is slightly longer than the output rate register 101 (i.e. we ensure that the X-ray energy which caused the threshold crossing is measurable by the existing pulse processor 114). When that timer reaches zero, the digital ramp is restarted at zero. This emulates the "reset" function of analog preamplifiers, which is well known in the art.

The existing pulse processor 114 will accept the artificial ramp and reproduce essentially the same distribution of energies measured free of pileup by the SDD pulse processor 103. In one particular embodiment, the items labeled 101, 102 and 104-113 are included with the SDD pulse processor 103. Alternatively, those items may be embodied in a separate hardware component operatively coupled to the SDD pulse processor 103.

Figure 2A:
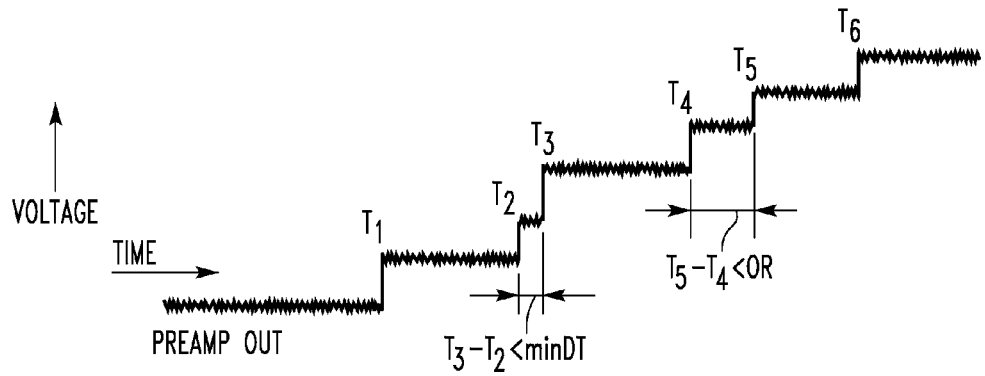
FIGS. 2A-2C are schematic illustrations of input waveform segments and the resulting artificial ramp outputs in the two operating modes of the present invention.
Figure 2B:
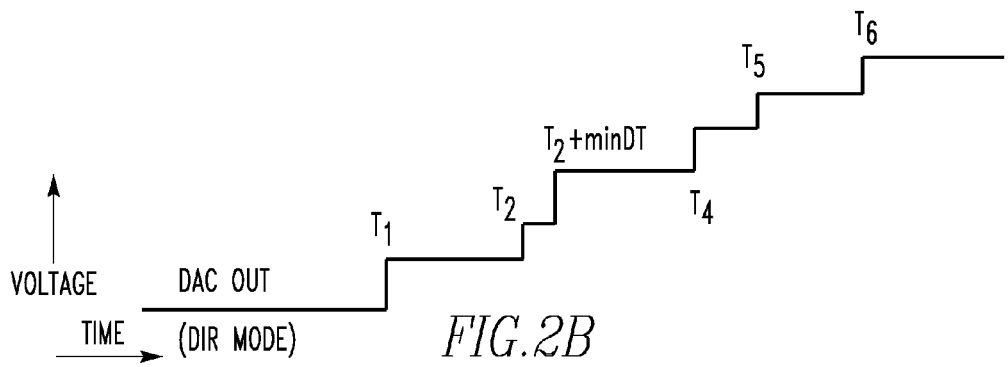
Figure 2C:
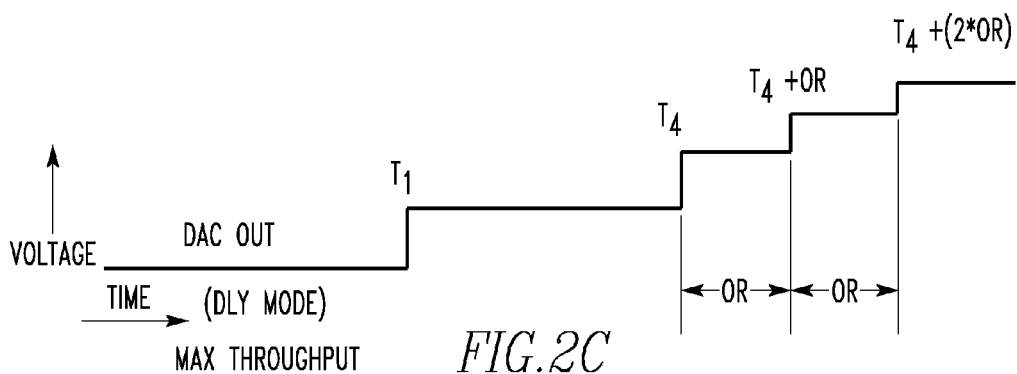
Figure 3:
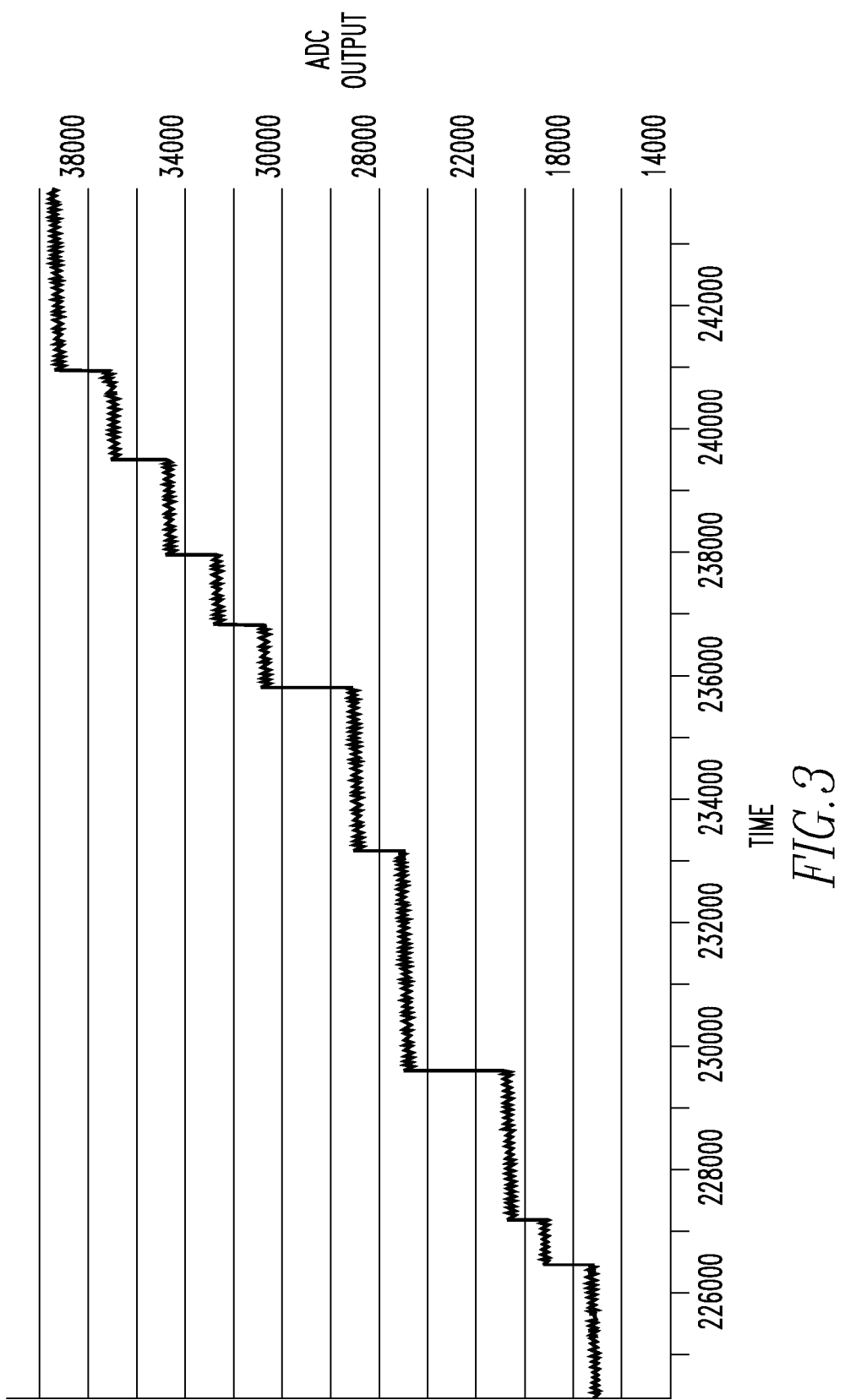
FIG. 3 shows a signal from an SDD-type detector and a pulsed-reset preamplifier.

Some example input waveform segments and the resulting artificial ramp outputs in the two operating modes of the present invention are illustrated in FIGS. 2A-2C. FIG. 2A represents the original digitized data from the SDD (i.e., the preamplifier output). Note that the edges at times $T_2$ and $T_3$ are too close together in time to be detected as pileup by the existing pulse processor 114, that is, $T_3-T_2<\text{minDT}$. FIG. 2B shows the output of the DAC 113 in response to the data from FIG. 2A in the direct mode of operation. As seen in FIG. 2B, the X-rays originally at times $T_2$ and $T_3$ have been reconstructed slightly farther apart so the existing pulse processor 114 will detect them as piled up. This eliminates a count which would otherwise appear in a "sum peak" artifact in the resulting spectrum. FIG. 2C shows the output of the DAC 113 in response to the data from FIG. 2A in the delay mode of operation. As seen in FIG. 2C, neither the event $T_2$ nor the event at $T_3$ appears in the reconstructed ramp. In the trace of FIG. 2A, the pulses at times $T_4$ and $T_5$ are too close together to be measured at the existing pulse processor 114's shortest shaping time. In the direct mode as shown in FIG. 2B, they will simply be passed through unchanged, and therefore be rejected as pileup by the existing pulse processor 114, maintaining the expected dead-time/live-time statistics. In the delay mode as shown in FIG. 2C, the edge (event) originally at $T_5$ is delayed until the time after $T_4$ is greater than the existing pulse processor 114's total processing time (i.e., dead time per pulse). That causes the edge (event) originally at time $T_6$ to also be delayed slightly in order to avoid pileup with the edge (event) originally at $T_5$.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of generating an input signal for an existing pulse processor of an energy-dispersive radiation spectrometry system, said existing pulse processor having a first dead time per pulse associated therewith, the method comprising:

receiving a preamplifier signal in an additional pulse processor separate from said existing pulse processor, said additional pulse processor having a second dead time per pulse associated therewith, said second dead time per pulse being shorter than said first dead time per pulse, said preamplifier signal being generated in response to a detector detecting a plurality of photons;

detecting in said additional pulse processor a plurality of edges in said preamplifier signal due to said plurality of photons, said edges being separated in time and being in an order, wherein each of said edges is determined to not be associated with a pileup;

generating an analog signal having lower noise than said preamplifier signal and having a plurality of steps, wherein each of said steps in said analog signal corresponds to and has a magnitude proportional to a respective one of the detected edges in said order, and wherein each adjacent pair of said steps is separated by at least said first dead time per pulse;

providing said analog signal to said existing pulse processor as an input to said existing pulse processor.

2. The method according to claim 1, wherein for each adjacent pair of said detected edges that is separated in time by a time greater than said first dead time per pulse the adjacent pair of said steps in said analog signal that corresponds thereto is separated by said time greater than said first dead time per pulse, and wherein for each adjacent pair of said detected edges that is separated in time by a time less than or equal to said first dead time per pulse the adjacent pair of said steps in said analog signal that corresponds thereto is separated by said first dead time per pulse.

3. The method according to claim 1, wherein each of said edges is determined by said additional pulse processor to correspond to a valid energy measurement made by said additional pulse processor, and wherein the magnitude of each step is based on the valid energy measurement corresponding to the edge that corresponds to the step.

4. The method according to claim 1, wherein said detector is a silicon drift detector.

5. A digital pulse processor adapted to perform the method according to claim 1, wherein said digital pulse processor is said additional pulse processor.

6. The method according to claim 1, wherein said energy-dispersive radiation spectrometry system is an X-ray spectrometry system.

7. A digital pulse processor adapted to perform the method according to claim 6, wherein said digital pulse processor is said additional pulse processor.

8. The method according to claim 1, wherein said energy-dispersive radiation spectrometry system is a gamma-ray spectrometry system.

9. A method of generating an input signal for an existing pulse processor of an energy-dispersive radiation spectrometry system, said existing pulse processor having a first pulse pair resolving time and a dead time per pulse associated therewith, the method comprising:
receiving a preamplifier signal in an additional pulse processor separate from said existing pulse processor, said additional pulse processor having a second pulse pair resolving time associated therewith, said second pulse pair resolving time being shorter than said first pulse pair resolving time, said preamplifier signal being generated in response to a detector detecting a plurality of photons;
detecting in said additional pulse processor a plurality of edges in said preamplifier signal due to said plurality of photons, said edges being separated in time and being in an order;
generating an analog signal having lower noise than said preamplifier signal and having a plurality of steps, wherein each of said steps in said analog signal corresponds to and has a magnitude proportional to a respective one of the detected edges in said order, and wherein for each adjacent pair of said edges that is separated in time by a time less than said second pulse pair resolving time the steps in said analog signal that correspond thereto are separated in time by at least said second pulse pair resolving time but less than said dead time per pulse; and
providing said analog signal to said existing pulse processor as an input to said existing pulse processor.

10. The method according to claim 9, wherein for each of said edges determined by said additional pulse processor to correspond to a valid energy measurement made by said additional pulse processor, the magnitude of the step corresponding to the edges is based on the valid energy measurement.

11. The method according to claim 9, wherein said detector is a silicon drift detector.

12. The method according to claim 9, wherein said energy-dispersive radiation spectrometry system is an X-ray spectrometry system.

13. The method according to claim 9, wherein said energy-dispersive radiation spectrometry system is a gamma-ray spectrometry system.

14. An energy-dispersive radiation spectrometry system, comprising:
an existing pulse processor having a first dead time per pulse associated therewith; and
an additional pulse processor separate from and operatively coupled to said existing pulse processor, said additional pulse processor having a second dead time per pulse associated therewith, said second dead time per pulse being shorter than said first dead time per pulse, said additional pulse processor being adapted to:
receive a preamplifier signal generated in response to a detector detecting a plurality of photons;
detect a plurality of edges in said preamplifier signal due to said plurality of photons, said edges being separated in time and being in an order, wherein each of said edges is determined not to be associated with a pileup;
generate an analog signal having lower noise than said preamplifier signal and having a plurality of steps, wherein each of said steps in said analog signal corresponds to and has a magnitude proportional to a respective one of the detected edges in said order, and wherein each adjacent pair of said steps is separated by at least said first dead time per pulse; and
provide said analog signal to said existing pulse processor as an input signal to said existing pulse processor.

15. The energy-dispersive radiation spectrometry system according to claim 14, wherein for each adjacent pair of said detected edges that is separated in time by a time greater than said first dead time per pulse the adjacent pair of said steps in said analog signal that corresponds thereto is separated by said time greater than said first dead time per pulse, and wherein for each adjacent pair of said detected edges that is separated in time by a time less than or equal to said first dead time per pulse the adjacent pair of said steps in said analog signal that corresponds thereto is separated by said first dead time per pulse.

16. The energy-dispersive radiation spectrometry system according to claim 14, wherein each of said edges is determined by said additional pulse processor to correspond to a valid energy measurement made by said additional pulse processor, and wherein the magnitude of each step is based on the valid energy measurement corresponding to the edge that corresponds to the step.

17. The energy-dispersive radiation spectrometry system according to claim 14, wherein said detector is a silicon drift detector.

18. The energy-dispersive radiation spectrometry system according to claim 14, wherein said energy-dispersive radiation spectrometry system is an X-ray spectrometry system.

19. The energy-dispersive radiation spectrometry system according to claim 14, wherein said energy-dispersive radiation spectrometry system is a gamma-ray spectrometry system.

20. An energy-dispersive radiation spectrometry system, comprising:
an existing pulse processor having a first pulse pair resolving time and a dead time per pulse associated therewith; and
an additional pulse processor separate from and operatively coupled to said existing pulse processor, said additional pulse processor having a second pulse pair resolving time associated therewith, said second pulse pair resolving time being shorter than said first pulse pair resolving time, said additional pulse processor being adapted to:
receive a preamplifier signal generated in response to a detector detecting a plurality of photons;
detect a plurality of edges in said preamplifier signal due to said plurality of photons, said edges being separated in time and being in an order;
generate an analog signal having lower noise than said preamplifier signal and having a plurality of steps, wherein each of said steps in said analog signal corresponds to and is proportional to a respective one of the detected edges in said order, and wherein for each adjacent pair of said edges that is separated in time by a time less than said second pulse pair resolving time the steps in said analog signal that correspond thereto are separated in time by at least said second pulse pair resolving time but less than said dead time per pulse; and provide said analog signal to said existing pulse processor as an input signal to said existing pulse processor.

21. The energy-dispersive radiation spectrometry system according to claim 20, wherein for each of said edges determined by said additional pulse processor to correspond to a valid energy measurement made by said additional pulse processor, the magnitude of the step corresponding to the edges is based on the valid energy measurement.

22. The energy-dispersive radiation spectrometry system according to claim 20, wherein said detector is a silicon drift detector.

23. The energy-dispersive radiation spectrometry system according to claim 20, wherein said energy-dispersive radiation spectrometry system is an X-ray spectrometry system.

24. The energy-dispersive radiation spectrometry system according to claim 20, wherein said energy-dispersive radiation spectrometry system is a gamma-ray spectrometry system.

25. A method of generating an input signal for an existing pulse processor of an energy-dispersive radiation spectrometry system, said existing pulse processor operating at a first shaping time and a corresponding first dead time per pulse, the method comprising:

receiving a preamplifier signal, said preamplifier signal being generated in response to a first plurality of photons being detected by a detector;

determining in an order according to arrival time at said detector an energy for each of a second plurality of said first plurality of photons based on said preamplifier signal using an additional pulse processor separate from said existing pulse processor and operating at a second shaping time and a corresponding second dead time per pulse, said second shaping time being less than said first shaping time and said second dead time per pulse being less than said first dead time per pulse;

storing each said energy;

generating an analog signal having lower noise than said preamplifier signal based on each said stored energy, said analog signal having a plurality of steps, wherein each of said steps in said analog signal corresponds to and has a magnitude proportional to a respective one of the stored energies in said order; and providing said analog signal to said existing pulse processor as an input to said existing pulse processor.

26. The method according to claim 25, wherein each of said second plurality of said first plurality of photons is determined to not be associated with a pileup, and wherein each one of said steps is separated from an adjacent one of said steps by a time equal to or greater than said first dead time per pulse.

27. The method according to claim 26, wherein each one of said energy steps is separated from an adjacent one of said energy steps said first dead time per pulse.

28. The method according to claim 25, wherein said first shaping time is a minimum nominal shaping time for said existing pulse processor.

29. The method according to claim 25, wherein said second shaping time is an optimum shaping time for said additional pulse processor.

30. The method according to claim 25, wherein said photons are X-ray photons and wherein said energy-dispersive radiation spectrometry system is an X-ray spectrometry system.

31. The method according to claim 25, wherein said detector is a silicon drift detector.

* * * * *

UNITED STATES PATENT AND TRADEMARK OFFICE
CERTIFICATE OF CORRECTION

| | |
|---|---|
| PATENT NO. | : 7,741,609 B2 |
| APPLICATION NO. | : 12/184605 |
| DATED | : June 22, 2010 |
| INVENTOR(S) | : Richard B. Mott |

It is certified that error appears in the above-identified patent and that said Letters Patent is hereby corrected as shown below:

Column 2, line 34, "In such as case" should read --In such a case--.
Column 3, line 53, "mater" should read --matter--.
Column 3, line 65, "a an gamma" should read --a gamma--.
Column 4, line 39, "a an gamma" should read --a gamma--.
Column 4, line 51, "a an gamma" should read --a gamma--.
Column 5, line 17, "a an gamma" should read --a gamma--.
Column 5, line 42, "function of based" should read --function based--.
Column 6, line 6, "embodiment which" should read --embodiment in which--.
Column 8, line 10, "embodiment which" should read --embodiment in which--.
Column 8, line 47, "i.e. the" should read --i.e., the--.
Column 8, line 64, "register 101 register" should read --register 101--.
Column 9, line 17, "i.e. the" should read --i.e., the--.
Column 9, line 38, "i.e. the" should read --i.e., the--.
Column 9, line 55, "i.e. the" should read --i.e., the--.
Column 14, Claim 27, line 21, "energy steps said first dead time per pulse" should read --energy steps by said first dead time per pulse--.

Signed and Sealed this
Twenty-second Day of March, 2011

David J. Kappos
*Director of the United States Patent and Trademark Office*